Aug. 15, 1967 — E. J. GRICHNIK — 3,335,554
DEVICE FOR PARTING ROWS OF COTTON PLANTS AND THE LIKE
Filed Dec. 23, 1964
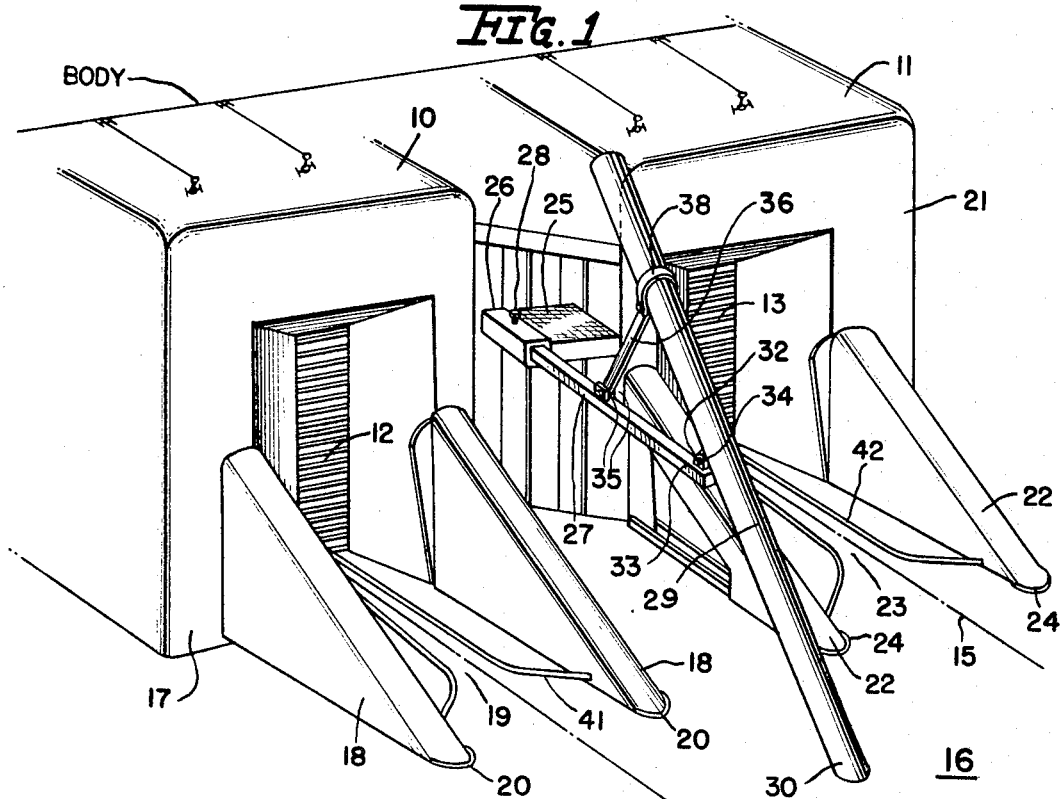
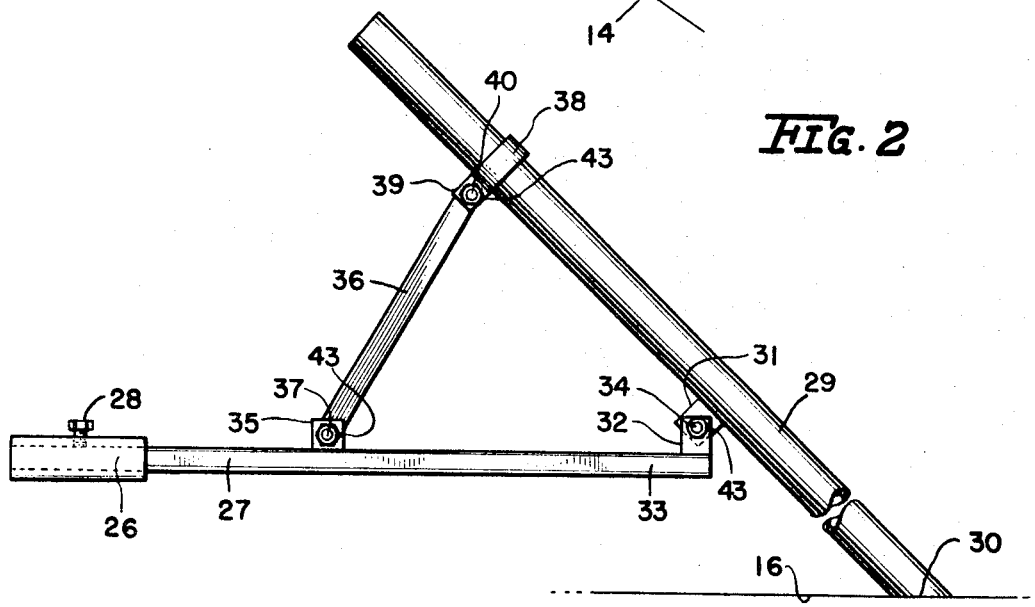
INVENTOR.
Emil J. Grichnik
John J. Kowalik
Atty.

United States Patent Office 3,335,554
Patented Aug. 15, 1967

3,335,554
DEVICE FOR PARTING ROWS OF COTTON PLANTS AND THE LIKE
Emil J. Grichnik, Memphis, Tenn., assignor to International Harvester Company, Chicago, Ill., a corporation of Delaware
Filed Dec. 23, 1964, Ser. No. 420,569
5 Claims. (Cl. 56—119)

ABSTRACT OF THE DISCLOSURE

A plant-parting structure having a diagonal downwardly and forwardly inclined element, a rod extending rearwardly from intermediate the ends of the element, a connector mounted on a floatingly mounted harvester, a rod adjustably secured to the connector and a brace extending between the rod and the element and adjustable longitudinally of the element.

---

The instant invention relates to plant harvesting devices. Particularly, it relates to cotton harvesters. Specifically, it relates to a mechanism for parting tangled cotton plants.

Conventional cotton picking machines comprise a power driven tractor which supports a plurality of spaced apart row units each of which is adapted to harvest or pick cotton from an elongated row of cotton plants, whereby a plurality of adjacent rows of cotton plants may be harvested simultaneously as a cotton harvesting tractor traverses a cotton field.

Each row unit of a conventional cotton harvesting device includes a casing or housing. A housing is disposed at a forward end portion of a cotton harvester. Cotton plants are fed into a housing through a throat defined by a pair of dividers carried on the outer or forward end portions of such housing. On the forward or outer end portions of dividers, there are carried ground engaging shoes, respectively.

The housing conventionally is supported by the frame of its tractor with respect to which such housing has a floating mounting. Because the dividers associated with a housing are rigidly secured thereto, such housing will move up and down on its floating mounting relative to the tractor body by reason of changes in the contour of the surface of the ground resulting from engagement therewith by an associated shoe. The purpose of the floating attachment of the housings is to position the crop gathering mechanism in a most desirable position relative to the immediate plants being harvested, whereby harvesting efficiency is maximized.

The nature of cotton plant growth is such, however, that it is not confined to the man-made rows in which the plants are intended to grow but rather occurs in and across the aisles between such rows by reason of which plants from adjacent rows become entangled. Generally, when the plants of adjacent rows are down, tangled and not separated or parted prior to harvesting, they tend to feed into a pair of row units simultaneously, causing a choking or clogging in the throats or receiving end portions of such row units. In addition to time loss thereby occasioned, loss of yield is also experienced as a result.

While prior art teaches various mechanisms which are adapted to separate tangled plants, such prior art devices are not wholly effective because they are not adjustable with respect to the changing contour of the surface immediately adjacent the plants to be untangled. That is, by reason of rigid securance of the prior plant parting mechanisms to tractor bodies, the dispositions of such parting mechanisms are determined by the ground contour below the wheels on which tractor bodies are mounted rather than by the contour of the ground adjacent the tangled plants being parted.

To have an effective plant parting mechanism on a cotton picking or harvesting device, it appears essential that the plant parting mechanism float relative to the body of the tractor for the purpose of adjusting the plant parting mechanism to the changes of the contour of the land at the place where the parting is to occur. That is, the plant parting mechanism should be at ground level and extend upwardly therefrom at all times. Thereby, maximum separation of tangled cotton plants can be achieved.

It is an object of the instant invention to provide an improved cotton plant harvesting machine and the like.

It is a further object of the instant invention to provide in a power driven cotton picking machine a novel plant parting construction for separating tangled cotton plants, the tangled portions of which bridge adjacent plant rows.

It is a yet further object of the instant invention to provide in a cotton harvesting device a plant parting mechanism for separating tangled plants and which floats relative to the tractor powering the cotton harvesting device.

A still further object of the instant invention is the provision in a power driven cotton harvester of a plant parting mechanism adapted to separate tangled plants and which is disposed medially of adjacent row units and is maintained in continuous ground engagement.

Another object of the invention is the provision of a plant parting mechanism in a cotton harvester which is operably connected to a floating harvester housing, whereby the plant parting mechanism adjusts to the contour of the ground adjacent the plants to be separated.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a perspective view of one embodiment of the instant invention showing the same mounted with respect to a pair of housings of adjacent cotton harvester row units.

FIG. 2 is a side elevational view of said embodiment, a portion broken away in the interest of conservation of drawing area.

Referring now more particularly to the drawings, in FIG. 1 there are shown a pair of housings, casings or what are referred to conventionally in the art as cotton harvester housings 10 and 11. Housings 10 and 11 comprise the forward end portions of a pair of harvester row units which are supported in driven relationship on opposite sides of a tractor (not illustrated). The housings 10 and 11 are operably connected to an unseen framework which provides for a free floating connection between the housings 10 and 11 and the tractor (not shown), whereby the housings 10 and 11 are movable independently of such tractor, in accordance with conventional practice.

The housings 10 and 11 have a pair of crop receiving entrance ways or openings 12 and 13, respectively, through which the gathered cotton crop is introduced into said housings. The spacing of the crop receiving openings 12 and 13 corresponds to the spacing of adjacent rows of cotton plants. Thereby, the plants from such rows will be passed into the housings 10 and 11, respectively, as said housings move forwardly in the direction of the lines 14 and 15 which represent parallel rows of cotton crop between which there is an aisle 16, as illustrated in FIG. 1.

The housing 10 is defined by a front face or plate 17 which is apertured to provide the opening 12. There are rigidly secured to the plate 17 on opposite sides of the opening 12 the rear end portions of a pair of substantially parallel bent and tapered conventional cheek members, pointers or row dividers 18 which are adapted to be disposed on opposite sides of the row 14 and form therebetween a throat 19 into which cotton plants from the row 14 are gathered for aggressive delivery by conventional means 41 through the opening or housing entrance way 12. At their forward end portions, the row dividers 18 carry a pair of shoes 20, respectively, which engage the ground on opposite sides of the row 14, whereby the housing 10 is adjusted relative to the tractor carrying the same according to the level of the ground adjacent plants about to be harvested.

In the device illustrated in the drawings, the housings 10 and 11 comprise substantially identical constructions, except to the extent noted to the contrary hereinafter. Accordingly, the housing 11 has a front face or plate 21 which is apertured to provide housing openings 13. A pair of substantially parallel bent and tapered row dividers, pointers or cheek members 22 have their inner end portions rigidly secured to the front plate 21 on opposite sides of the opening or entrance way 13. The dividers 22 extend forwardly from the housing plate 21 and are adapted to be disposed on opposite sides of the row 15. Said dividers 22 form therebetween a throat 23 into which cotton plants from row 15 pass as the tractor carrying the housings 10 and 11 advances to gather and aggressively feed such plants, by conventional means 42, through the housing opening 13 into the housing 11. At their forward end portions, the row dividers 22 have secured thereon or integral therewith a pair of shoes 24, respectively, which ride on the surface of the ground on opposite sides of the row 15, whereby variations in changing surface contours cause the free floating housing 11 to adjust its position relative to the body of the tractor carrying said housing 11 in a manner and by means which are well known in the art.

As illustrated in FIG. 1, a frame member, rigid structure or horizontal flat 25 is rigidly secured to one of the housings or bodies, in the illustration being the housing 11. The flat 25 is vertically spaced from the ground and extends over the aisle 16, and, as illustrated in the drawings, the flat 25 may serve as a step adapted for use to elevate a mechanic or a tractor operator.

The flat 25 has rigidly secured thereto a tube 26 which is disposed over aisle 16 and which may be rectangular in cross section with its bore extending longitudinally of the path of movement of the cotton harvester. An elongated arm or rod 27 is adjustably mounted within the tube 26 with its adjustability being longitudinal of the path of movement of the harvester. The arm or rod 27 may be adjustably secured in selected positions by means such as a set screw 28 which is threaded through the tube 26 and bears against the rod or arm 27 in an apparent manner.

An elongated plant separator 29 is angularly disposed in a plane with the rod or arm 27, whereby said plant separator 29 crosses in front of said rod or arm 27 extending downwardly as it extends forwardly. At its lower end 30, the plant separator 29 has a ground engaging face which is adapted to ride in the path 16 substantially midway between the rows 14 and 15.

As illustrated in FIG. 2, the plant separator 29 may be of tubular construction, and said plant separator 29 carries or has secured thereto a downwardly extending lug or ear 31 which is pivotably secured between a pair of ears 32. The ears 32 are rigidly secured to or integral with the outer or forward end portion 33 of the rod or arm 27 from which said ears 32 extend upwardly. A pivotal securance or connection of the separator 29 to the rod or arm 27 is by means including a pin 34 which extends through aligned apertures in the lug 31 and the upwardly extending ears 32.

A pair of upwardly extending lugs or ears 35 are integral with or have their lower end portions rigidly secured to a medial portion of the arm or rod 27. The ears 35 may be parallel and spaced apart, and the lower end portion of an angularly disposed elongated arm 36 is mounted between the ears 35 by means which may include a pivot pin 37, or the like, which provides a transverse axis of rotation about which the angulation of the arm 36 with respect to arm or rod 27 may be adjusted in a vertical plane.

A ring-like clamp or adjustable fastener 38 is disposed about the plant separator 29. Said clamp 38 has a pair of depending ears 39, one only of which is seen in the drawings, between which the upper end portion of the arm 36 is retained by means including a pivot pin 40 or the like which extends through said ears 39 and the upper end portion of the arm so disposed therebetween.

By reason of the foregoing construction, the plant separating or parting mechanism is adjustable by plural means as follows: The rod 27 may be extended downstream or upstream with respect to the path of movement of the harvesting machine, being adjustably secured by means of set screw 28. Additionally, the separator 29 may be adjusted relatively to the rod or arm 27, whereby the angular inclination and partially the forward and rearward extension thereof may be controlled by reason of the pivotal connections on axes provided by pins 34, 37 and 40. It is appreciated, of course, that the ring or collar 38 is capable of limited adjustment longitudinally of the longitudinal axis of the separator 29. Following adjustment, the parts are locked by lock nuts 43 mounted on opposite threaded ends of pins 34, 37 and 40.

Accordingly, adjustments can be made in the dispostion of the parting mechanism, depending upon the extensiveness or density of the downed plants and the tangling bridging the path 16. An operator will learn the desired positions in relationship to the crop conditions based upon his experience.

Furthermore, the plant parting mechanism is free floating relative to the tractor (not seen) which carries the housings 10 and 11. By reason of the floating connection of the housings to one of which said plant parting mechanism is rigidly secured. Thereby, in the sense that housings 10 and 11 are free floating relative to the tractor, the plant parting mechanism is also free floating. The foregoing arrangement inexpensively provides a plant parting mechanism which forces down and tangled plants which bridge the path 16 toward opposite rows 14 and 15, and substantially minimizes choking when compared to prior apparatus, by reason of the fact that the freely flowing plant parting mechanism engages plants in the path 16 adjacent the ground surface, or as closely as the same can be to the ground surface, where plant parting is to occur.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In a cotton harvester having a mobile body, a plurality of harvester row units mounted on said body in spaced apart relationship transversely of the normal path of movement of said body, each row unit having a pair of laterally spaced dividers, said row units adapted to receive plants from adjacent rows and a plant parting mechanism for parting plants tangled between rows being harvested, said plant parting mechanism comprising an elongated plant separator angularly disposed medially of a pair of row units and adjacent and forward thereof, said plant separator having a ground engaging front end portion, and an independently adjustable connector operably secured to said plant separator and carried by said body, and with said plant separator.

2. In a cotton harvester and the like having a power driven body a plurality of harvester row units mounted on said body in spaced apart relationship transversely of the normal path of movement of said body, said row units adapted to receive aggressively fed plants from adjacent rows being harvested and a plant parting mechanism for parting plants tangled between rows being harvested, said plant parting mechanism comprising an elongated plant separator disposed at an angle in a vertical plane, said plant separator having a forwardly and downwardly extending ground engageable end portion disposed adjacent and forward of said row units; a floating connector rockably connected to said body; an elongated rod having a rear end portion secured to said connector and extendable longitudinally of a path in which said body is normally movable; adjusting means connecting said rod to and for selectively altering the angular inclination of said plant separator.

3. The device defined in claim 1 in which said connector comprises
   a rod extending generally parallel to the path of movement of the body,
   a clamp adjustable longitudinally of said plant separator,
   an arm disposed angularly in the plane of said plant separator, said arm having upper and lower end portions pivotably connected to said clamp and said rod, respectively, and
   means pivotably connecting said plant separator to the front end portion of said rod.

4. The combination of claim 1 and said connector comprising
   an elongated tube rigidly secured to a row unit with its longitudinal axis disposed longitudinally of said harvester;
   a longitudinally adjustable rod disposed in said tube and having a forward end portion adapted to be extended forwardly;
   said plant separator angularly disposed across said end portion and pivotably connected thereto; and
   an angularly disposed arm having an upper and a lower end portion,
   the upper end portion pivotably secured to said plant separator, and
   the lower end portion pivotably secured to said rod.

5. For use with a cotton harvester having a row unit floating housing disposed at the front end portion of said harvester, a plant parting mechanism adapted to separate cotton plants and the like tangled across adjacent rows being harvested, said plant parting mechanism comprising
   an elongated tube adapted to be rigidly secured to said drum with its longitudinal axis disposed longitudinally of said harvester;
   a rod having a rear end portion disposed in said tube and adjustable longitudinally thereof,
      said rod having a front end portion adapted to extend forwardly between a pair of row units;
   an elongated plant separator disposed angularly in the plane of said rod and extending forwardly and downwardly across said front end portion,
      said plant separator having a forward end portion adapted for ground engagement adjacent and forward of said row unit,
      said plant separator having a medial portion pivotably secured to said front end portion;
   a curved clamp adjustably mounted longitudinally of said plant separator and disposed above said rod, and
   an arm extending upwardly from said plant separator and having an upper and a lower end portion pivotably secured to said clamp and said rod, respectively,
   whereby the length and inclination of said parting mechanism are adjustable with reference to a fixed securance and in such adjusted position floatable with respect to a tractor.

References Cited
UNITED STATES PATENTS

| | | | |
|---|---|---|---|
| 1,893,863 | 1/1933 | Kerns | 56—229 |
| 2,653,436 | 9/1953 | Warner | 56—119 |
| 2,672,001 | 3/1954 | Bopf et al. | 56—14 |
| 2,709,326 | 5/1955 | Coombe | 56—229 |

ABRAHAM G. STONE, *Primary Examiner.*

ANTONIO F. GUIDA, *Examiner.*